US012180054B2

(12) United States Patent
Frederick et al.

(10) Patent No.: US 12,180,054 B2
(45) Date of Patent: Dec. 31, 2024

(54) BOTTLE OPENER HAT CLIP

(71) Applicant: Popping Caps, LLC, Spotsylvania, VA (US)

(72) Inventors: Christopher Frederick, Spotsylvania, VA (US); Nathan Frederick, Stafford, VA (US)

(73) Assignee: Popping Caps, LLC, Spotsylvania, VA (US)

( * ) Notice: Subject to any disclaimer, the term of this patent is extended or adjusted under 35 U.S.C. 154(b) by 119 days.

(21) Appl. No.: 18/074,742

(22) Filed: Dec. 5, 2022

(65) Prior Publication Data

US 2023/0174362 A1 Jun. 8, 2023

Related U.S. Application Data

(60) Provisional application No. 63/286,785, filed on Dec. 7, 2021.

(51) Int. Cl.
*B67B 7/16* (2006.01)
*A45F 5/02* (2006.01)

(52) U.S. Cl.
CPC . *B67B 7/16* (2013.01); *A45F 5/02* (2013.01)

(58) Field of Classification Search
CPC .................................... B67B 7/16; A45F 5/02
USPC .......................................................... 224/269
See application file for complete search history.

(56) References Cited

U.S. PATENT DOCUMENTS 1,267,052 A 5/1918 Burnett
D144,839 S * 5/1946 Coles .............................. D8/18
D171,311 S * 1/1954 Schaefer ........................ D19/86
D409,464 S * 5/1999 Garza ......................... D11/78.1
D461,427 S 8/2002 Braner
6,851,147 B2 * 2/2005 Abrahall .................. B67B 7/44 81/3.55
D521,332 S * 5/2006 Dighton .......................... D8/38
D540,130 S 4/2007 Wysopal
D550,931 S 9/2007 Valcourt
7,284,284 B2 * 10/2007 Wysopal ................. A42B 1/24 2/209.13
D557,089 S * 12/2007 Menard ............................ D8/34
D571,539 S * 6/2008 Valcourt ........................ D2/866
D582,131 S 12/2008 French, III
7,568,250 B2 * 8/2009 Menard-Flanagan ..... B67B 7/16 24/3.12
8,206,236 B1 6/2012 Neu
D705,527 S 5/2014 Clark
8,757,030 B2 * 6/2014 Ochs ......................... B67B 7/16 81/3.4
10,227,257 B2 3/2019 Corner
(Continued)

FOREIGN PATENT DOCUMENTS

WO 2008058431 5/2008

*Primary Examiner* — Peter N Helvey

(57) ABSTRACT

The invention is a bottle opener and hat clip having a body portion comprising a generally U-shaped end forming a channel and a bottle cap opener end, the U-shaped end includes an interior ridge within the channel, the U-shaped end having a planar top surface, a handle portion is secured to the top surface of the U-shaped end and is disposed over the bottle cap opener end, the handle functions as a lever for the bottle opener and is adapted to be decorative or contain indicia that is displayed when the device is secured to the bill of a hat by inserting the hat bill within the channel of the U-shaped end.

13 Claims, 4 Drawing Sheets

(56) References Cited

U.S. PATENT DOCUMENTS

| | | | | |
|---|---|---|---|---|
| 10,492,554 | B2 | 12/2019 | Sears | |
| 2004/0083552 | A1 * | 5/2004 | Abrahall .................. | B67B 7/44 7/151 |
| 2007/0271679 | A1 | 11/2007 | Wysopal | |

* cited by examiner

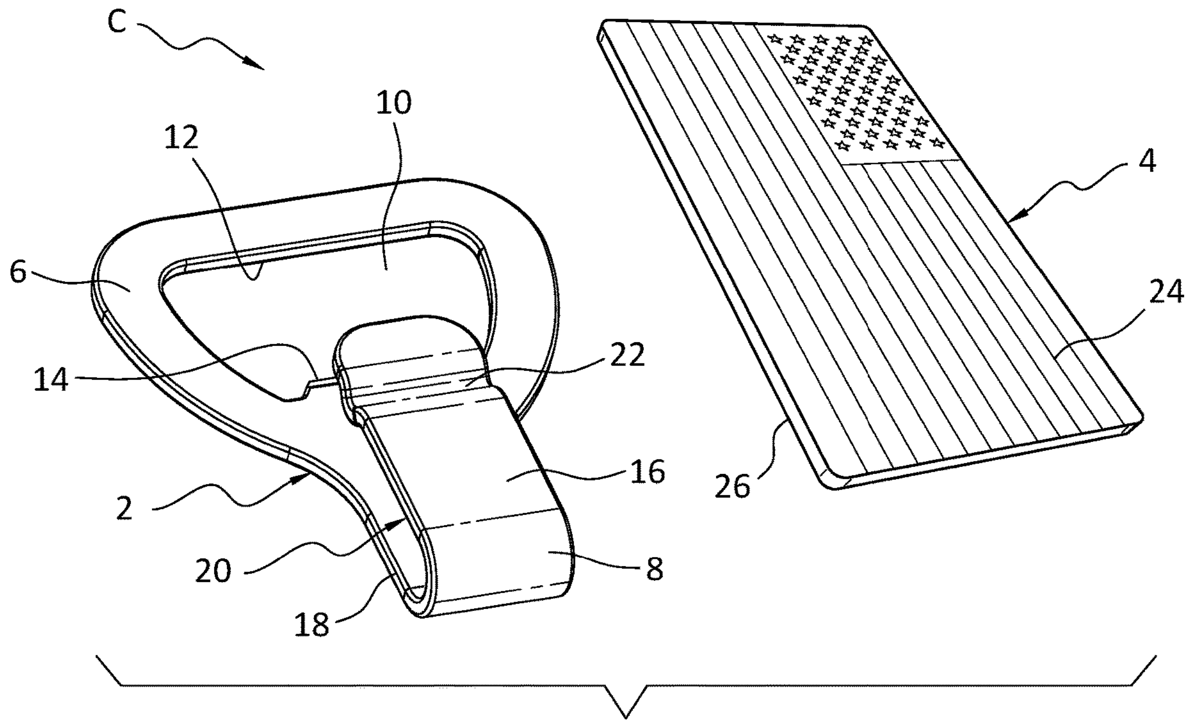
FIG. 3
FIG. 4
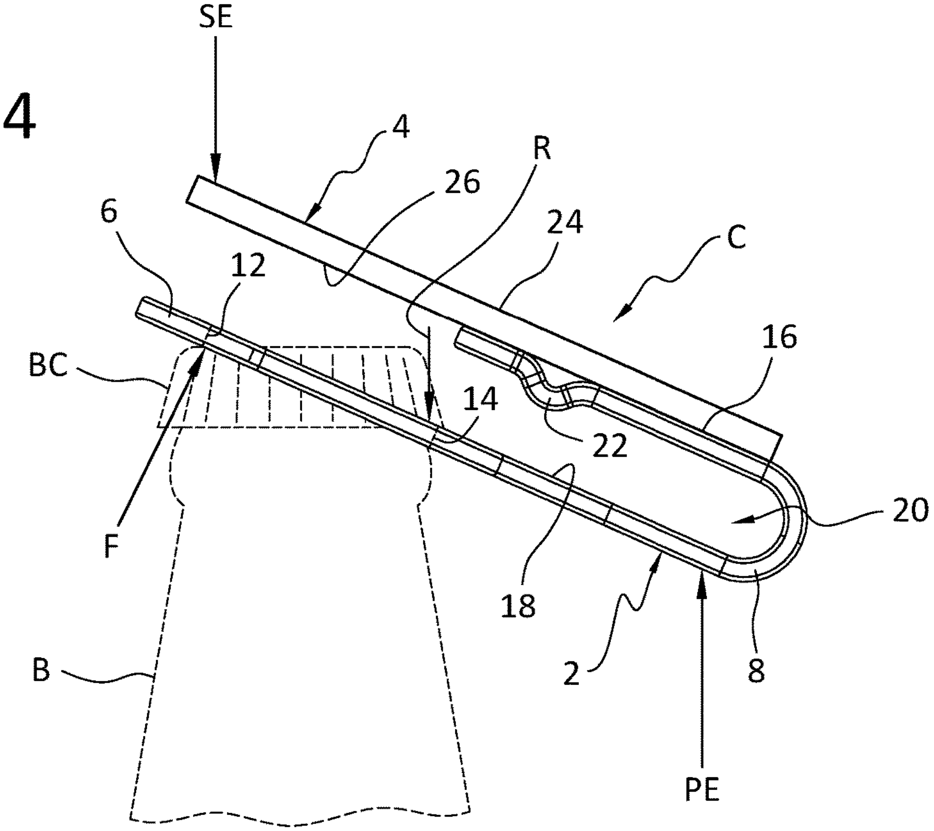

BOTTLE OPENER HAT CLIP

CROSS-REFERENCE TO RELATED APPLICATIONS

This application claims the benefit of priority from U.S. Provisional Application Ser. No. 63/286,785 filed on Dec. 7, 2021, which is incorporated herein by reference.

FIELD OF THE INVENTION

The present invention is a bottle opener that can be secured to the bill of a hat when not in use.

BACKGROUND OF THE INVENTION

A bottle opener is a device that removes the metal cap from a glass bottle. The bottle cap is tightly secured to the rim of the bottle neck by a series of pleats that extend the circumference of the cap. The bottle opener functions as a lever when inserted beneath the pleated metalwork of the bottle cap to enable the cap top to act as a fulcrum when the opener is pivoted upwardly so as to bend the cap and dislodged it from the neck of the bottle.

There are many kinds of bottle openers, most have a relatively long handle but others do not so long as they are fixed to a wall or to the side of a cooler. Some bottle openers are small enough to be carried on a keychain.

It is not uncommon to forget to bring a bottle opener when traveling or going to an event. When a bottle opener is carried in a pocket it can add unnecessary bulk, even when secured to a keychain.

It is known to provide a bottle opener that is integral with the bill of a hat but that is detachable for use. However, these devices are unduly complex and may only be used with the hat they are integral with. In addition, prior art openers that are adapted to be secured to a hat are not aesthetically pleasing and lack a sufficiently long handle which limits its effectiveness as a bottle opener.

A need has therefore existed in the art for a bottle cap opener that can be attached to the bill of any hat, that is not bulky and provides sufficient leverage during use, and is aesthetically pleasing when secured to the bill of a hat.

BRIEF SUMMARY OF THE INVENTION

The present invention is a bottle opener hat clip having a body portion comprising a generally U-shaped end and a bottle cap opener end, the U-shaped end includes an interior ridge that narrows a channel formed by the U-shaped end, the U-shaped end having a planar top surface, a plate portion is secured to the planar top surface of the U-shaped end and overlies the bottle cap opener end, the plate functioning as a lever for the bottle opener and adapted to contain decorative indicia that is displayed when the device is secured to the bill of a hat by inserting the bill inside the U-shaped end. The invention includes a method for firmly joining the plate portion to the body portion.

The present invention is also a bottle opener and hat clip comprising a body having a first portion and a second portion, the first and second portions have a width and a length and are superposed to provide a channel for receiving the bill of a hat, the body second portion has a top surface and a bottom surface, the body second portion top surface is substantially planar, a bottle opener extends from the body first portion and is not superposed by the body's second portion, a protrusion extends from the body's second portion bottom surface and within the channel, and a handle having a top surface and a bottom surface, the bottom surface of the handle is substantially planar, the handle bottom surface is bonded to the top surface of the body's second portion and is superposed over the bottle opener, the handle has a width and length greater than the width and length of the body's first portion to provide leverage when the bottle opener is engaged with a bottle cap.

The present invention is also a bottle opener and hat clip comprising a body having a first portion and a second portion, the first and second portions of the body have a width and a length and are superposed to provide a channel that is adapted to receive the bill of a hat, the second portion having a top surface and a bottom surface, the second portion top surface is substantially planar, a bottle opener, the bottle opener includes a fulcrum portion for engaging the cap of a bottle, the bottle opener extends from the body first portion and is not superposed by the body second portion, a protrusion, the protrusion extends from the second portion bottom surface and into the channel, a handle, the handle has a top surface and a bottom surface, the handle bottom surface is substantially planar and is bonded to the top surface of the body's second portion and is superposed over the fulcrum portion of the bottle opener, the handle having a first and second lever arm portion, the first lever arm portion extending from the underlying fulcrum portion of the bottle opener and a second lever arm portion extending from the underlying fulcrum portion and in a direction opposite from the first lever arm portion so as to provide leverage when the bottle opener is engaged with a bottle cap.

BRIEF DESCRIPTION OF THE SEVERAL VIEWS OF THE DRAWINGS

FIG. 3 is a perspective view of the present invention with the bottle opener portion and the decorative handle portion shown separate from each other;

FIG. 4 is side view of the present invention and with the bottle opener portion engaged with a bottle cap of a bottle, both of which are shown in phantom lines;

DETAILED DESCRIPTION OF THE INVENTION

Figure 1:
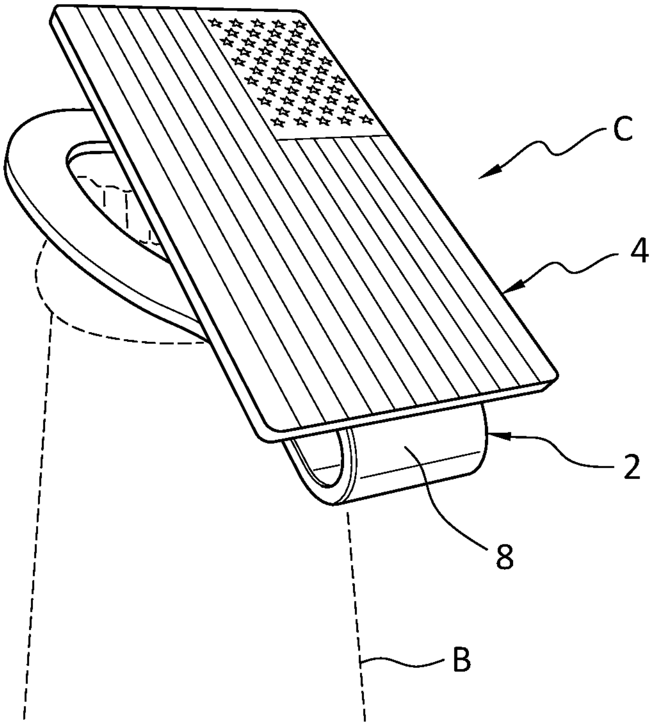
FIG. 1 is a perspective view of the present invention when engaged with a bottle cap, the bottle cap and bottle shown in phantom lines.
Figure 2:
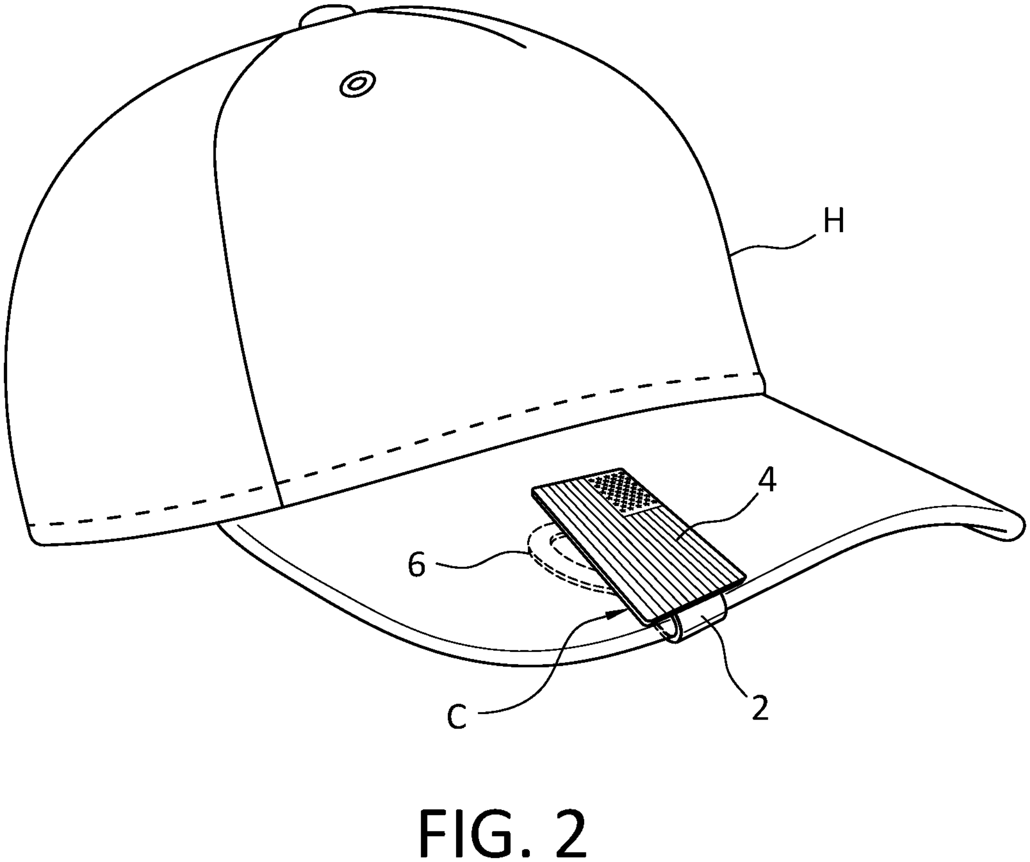
FIG. 2 is a perspective view of the present invention when secured to the bill of a hat and with the bottle opener portion shown in phantom lines.

FIGS. 1 and 4 illustrate the bottle opener hat clip C according to the present invention when in a position to open a bottle cap BC of a bottle B. FIG. 2 illustrates the bottle opener hat clip C when secured to the bill of a hat H.

Turning to FIGS. 3 and 4, the bottle opener hat clip C is shown to comprise a body portion 2 and a handle 4 shown in the figure to be a plate that is shaped and includes printing to resemble a flag. The construction materials are preferably metal and especially brass metal. Other materials are within the scope of the present invention. FIG. 3 shows the body portion 2 has a bottle cap opener end 6 and a hat clip end 8. The bottle cap opener end 6 has a rectangular or rounded opening 10 formed by a circumferential rim to provide a fulcrum F when engaged against a bottle cap and as best shown in FIG. 4. The rim 12 is provided with a lip 14 that when placed under an edge of the bottle cap BC and as best shown in FIG. 4, provides resistance R relative to the fulcrum F in the known manner.

As best shown in FIG. 3, the hat clip end 8 of body portion 2 is provided with a generally U-shaped channel 20 that is formed between the top portion 16 and bottom portion 18 of clip end 8. In a preferred embodiment, the top portion 16 of hat clip end 8 is provided with a ridge or protrusion 22 that extends from a bottom surface of top portion 16 within the U-shaped channel 20 and in a direction toward bottom portion 18 of clip end 8. The ridge 22 restricts the gap formed within the U-shaped channel 20 to enable the device to more securely grasp the bill of a hat H as shown in FIG. 2. As is apparent, ridge 22 may be provided on the bottom portion 18 instead of top portion 16, or may be provided on both the bottom and the top portions, or may be removed entirely depending on design considerations.

Turning again to FIG. 3, the surface of top portion 16 is shown to be essentially planar except at interior ridge 22 which provides a slightly concave region on its surface. As is apparent, this concave region or portion of interior ridge may be modified to remove the concave surface by, for example, increasing the thickness of the top portion 16 at ridge 22 so that the surface along top portion 16 is continuously planar. While the upper surface of top portion 16 may have a concave portion due to the inclusion of interior ridge 22, the portions of the upper surface of top portion 16 that are not part of the concave ridge 22 are planar as shown in the figures and as will be further explained below.

As noted earlier, handle 4 is shown to have a rectangular shape and is provided with indicia on top surface 24 that is depicted in the figures to be an American flag. As is apparent, other shapes and indicia are within the scope of the present invention including no indicia at all. The handle 4 has a bottom surface 26 that is planar. While the handle 4 may include openings that extend between the handle's top surface 24 and handle's bottom surface 26 for decorative or other reasons (FIG. 8), the handle's bottom surface 26 is essentially planar at all regions where it contacts the top portion 16 of hat clip end 8.

The handle 4 provides several functions. It can be ornamentally shaped or its top surface 24 may contain decorative indicia for when the invention is secured to a hat H as in FIG. 2. The hat clip end 8 and bottle opener end 6 of body portion 2 are not visible when secured to the bill of a hat H. It functions as a handle that can be gripped when the invention is being used to open a bottle (FIGS. 1 and 4). The handle 4 is fixed to, unitary with, or otherwise bonded to top portion 16 of clip end 8 and has a length and width such that it is superposed over the bottle opener 6 to provide leverage when opening a bottle cap. This is best shown in FIG. 4 where bottle cap opener end 4 is engaged against a bottle cap BC at fulcrum point F and resistance point R. A primary effort PE is upwardly exerted by the user at clip end 8 and a secondary effort SE may be simultaneously applied when the user grasps handle 4 that overlies bottle cap opener end 4. The handle 4 and clip end 8 cooperate to provide single lever arm for opening a bottle cap BC. At the same time, the handle 4 including indicia overlies the bottle cap opener end 6 or otherwise covers it to renders the device more aesthetically pleasing.

Figure 5:
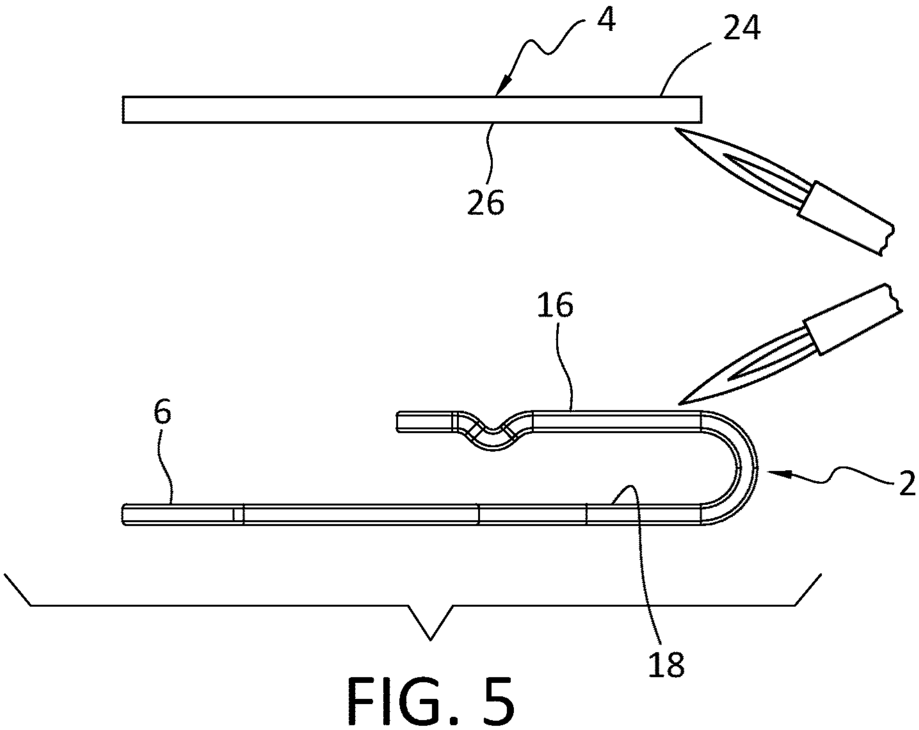
FIG. 5 is a side view showing a method step during assembly.
Figure 6:
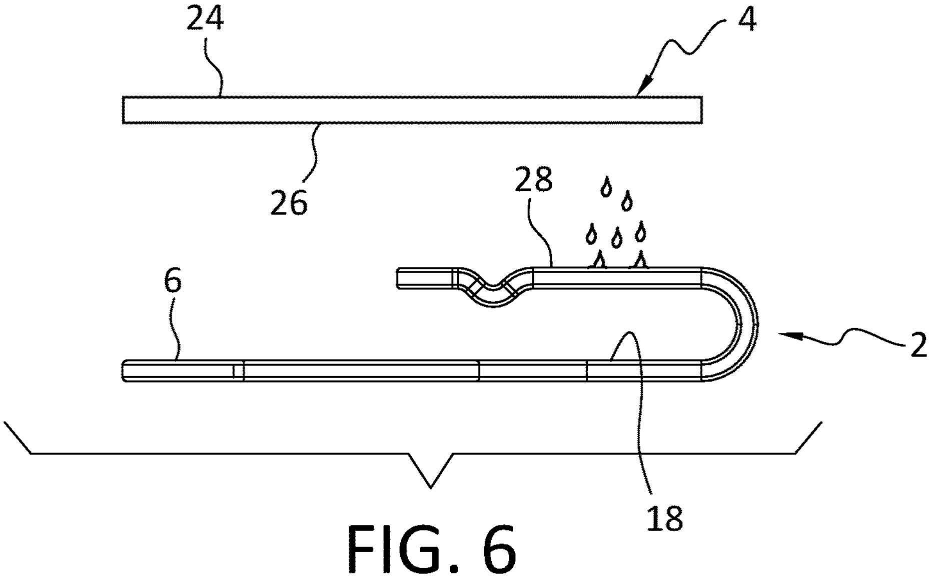
FIG. 6 is side view showing a method step during assembly.
Figure 7:
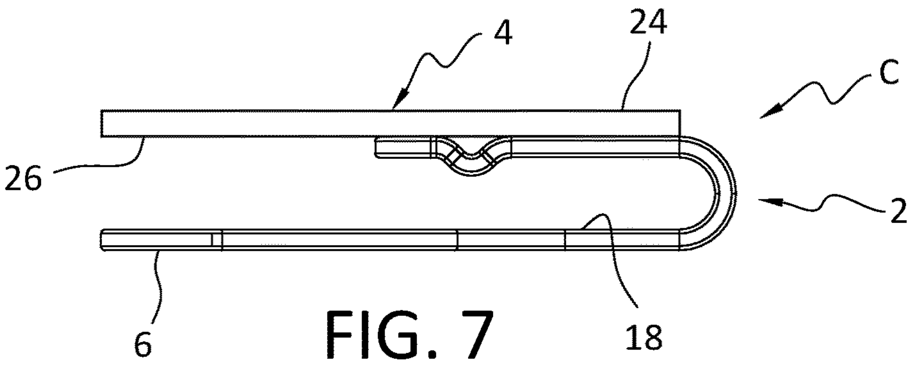
FIG. 7 is a side view of the present invention following assembly.

FIGS. 5, 6 and 7 illustrate the assembly of the device according to the present invention using a silver welding method to provide a good connection. The body portion 2 and the handle 4 are first heated to a high temperature (FIG. 5) after which welding oil is applied to the planar surface of the top portion 16 of hat clip end 8, the latent heat of the metal causes the oil to quickly spread across the entire planar surface (FIG. 6). The body portion 2 and the handle are then pressed together (FIG. 7) to fix them in place with a clean weld having no discernable weld joint. The planar surfaces provided on the bottom 26 of handle 4 and the top 16 of hat clip end 8 enable a superior weld.

Figure 8:
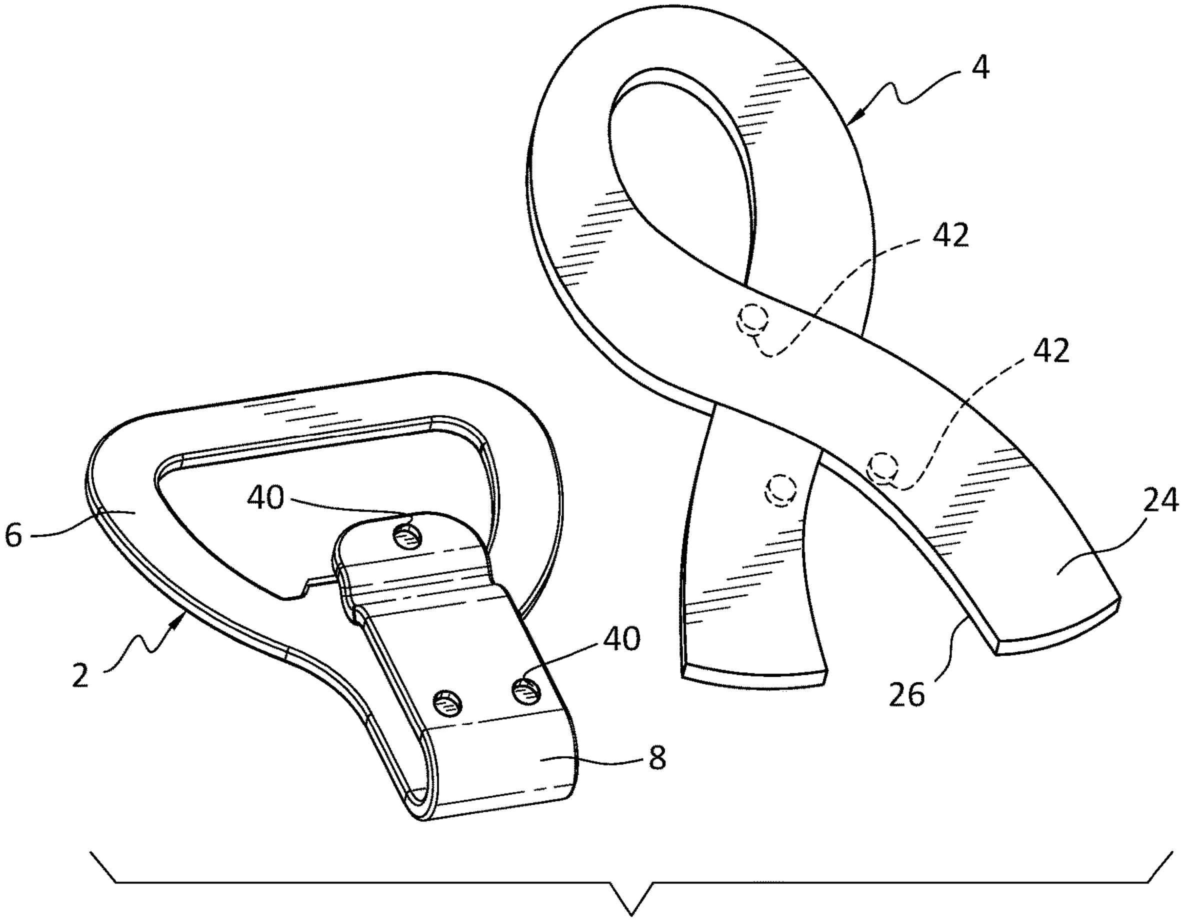
FIG. 8 is a perspective view of another embodiment of the present invention with the bottle opener portion and the decorative portion shown separate from each other.

FIG. 8 illustrates another embodiment of the present invention where the top portion 16 of clip end 8 is provided with recessed portions 40 extending below the surface of top portion 16. Cooperating raised members 42 are provided on the bottom surface 26 of handle 4 and are configured to mate with recessed portions 40 to prevent the clip end 8 and the handle 4 from shifting when they are bonded or otherwise joined together.

Figure 9:
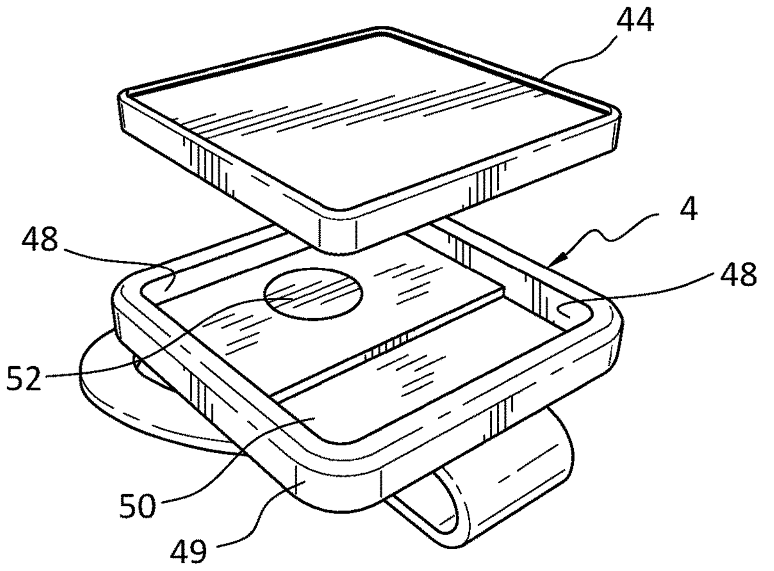
FIG. 9 is a perspective view of another embodiment of the present invention and where the decorative handle portion includes a removable golf ball marker.

FIG. 9 illustrates another embodiment of the present invention where the handle 4 is adapted to house a golf ball marker 44 or other device. In this embodiment the handle 4 comprises a frame member 49 having raised side walls 48. The bottom 50 of the frame member 49 contains a magnet 52 that enables ball marker 44 to be releasably held within frame member 49 through contact between the magnet and the underside of ball marker 44.

While this invention has been described as having a preferred design, it is understood that it is capable of further modifications, uses and adaptations, both in whole and in part, while following the general principle of the invention including such departures from the present disclosure as is known or customary practice in the art to which this invention pertains, and as may be applied to the central features of this invention.

We claim:

1. A bottle opener and hat clip comprising:

a) a body, the body having a first portion and a second portion, the first and second portions have a width and a length and are superposed so as to provide a channel adapted to receive the bill of a hat, the second portion having a top surface and a bottom surface, the second portion top surface is substantially planar;

b) a bottle opener, the bottle opener extends from the body first portion and is not superposed by the body's second portion;

c) a protrusion, the protrusion extends from the second portion bottom surface and within the channel; and d) a handle, the handle having a top surface and a bottom surface, the bottom surface of the handle is substantially planar, the handle bottom surface is bonded to the top surface of the body's second portion and is superposed over the bottle opener, the handle has a width and length greater than the width and length of the body's first portion to provide leverage when the bottle opener is engaged with a bottle cap.

2. The bottle opener and hat clip recited in claim 1 and wherein the handle has a decorative shape.

3. The bottle opener and hat clip as in claim 1 and wherein the handle top surface includes printed indicia.

4. The bottle opener and hat clip as in claim 1 and wherein when the bill of a hat is placed within the channel, the bottle opener is substantially hidden from view.

5. The bottle opener and hat clip as in claim 1 and wherein the handle and the bottle opener are configured to be squeezed together to capture a bottle cap after it has been removed from the bottle.

6. The bottle opener and hat clip as in claim 1 and further comprising recessed portions and raised portions that interfit together, the recessed portions extend into the body's second portion top surface and the raised portions are provided on the handle bottom surface.

7. The bottle opener and hat clip as in claim 1 and wherein the handle portion includes a removable golf ball marker.

8. A bottle opener and hat clip comprising:

a) a body, the body having a first portion and a second portion, the first and second portions have a width and a length and are superposed to provide a channel that is adapted to receive the bill of a hat, the second portion having a top surface and a bottom surface, the second portion top surface is substantially planar;

b) a bottle opener, the bottle opener includes a fulcrum portion for engaging the cap of a bottle, the bottle opener extends from the body first portion and is not superposed by the body second portion;

c) a protrusion, the protrusion extends from the second portion bottom surface and into the channel;

d) a handle, the handle has a top surface and a bottom surface, the handle bottom surface is substantially planar and is bonded to the top surface of the body's second portion and is superposed over the fulcrum portion of the bottle opener, the handle having a first and second lever arm portion, the first lever arm portion extending from the underlying fulcrum portion of the bottle opener and a second lever arm portion extending from the underlying fulcrum portion and in a direction opposite from the first lever arm portion so as to provide leverage when the bottle opener is engaged with a bottle cap.

9. The bottle opener and hat clip recited in claim 8 and wherein the handle has a decorative shape.

10. The bottle opener and hat clip as in claim 8 and wherein the handle top surface includes printed indicia.

11. The bottle opener and hat clip as in claim 8 and wherein when the bill of a hat is placed within the channel, the bottle opener is substantially hidden from view.

12. The bottle opener and hat clip as in claim 8 and further comprising recessed portions and raised portions that interfit together, the recessed portions extend into the body's second portion top surface and the raised portions are provided on the handle bottom surface.

13. The bottle opener and hat clip as in claim 8 and wherein the handle portion includes a removable golf ball marker.

* * * * *